(12) United States Patent
Bhamidipati et al.

(10) Patent No.: US 11,349,533 B2
(45) Date of Patent: May 31, 2022

(54) DYNAMIC ANTENNA WEIGHT VECTOR CODEBOOKS

(71) Applicant: Apple Inc., Cupertino, CA (US)

(72) Inventors: Srinivasa Yasasvy Sateesh Bhamidipati, Milpitas, CA (US); Vineet Nayak, Sunnyvale, CA (US); Wassim El-Hassan, San Jose, CA (US); Xuefeng Zhao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 16/145,990

(22) Filed: Sep. 28, 2018

(65) Prior Publication Data
US 2020/0106493 A1 Apr. 2, 2020

(51) Int. Cl.
*H04B 7/0456* (2017.01)
*H04B 7/06* (2006.01)
*H01Q 1/22* (2006.01)

(52) U.S. Cl.
CPC ......... *H04B 7/0456* (2013.01); *H01Q 1/2291* (2013.01); *H04B 7/0617* (2013.01)

(58) Field of Classification Search
CPC .. H04B 7/0478; H04B 7/0617; H04B 7/0404; H04B 7/0634; H04B 7/0482; H04B 7/0452; H04B 7/0413–0456
See application file for complete search history.

(56) References Cited

U.S. PATENT DOCUMENTS

| | | | |
|---|---|---|---|
| 5,973,643 A | 10/1999 | Hawkes et al. | |
| 8,379,745 B1 | 2/2013 | Nabar et al. | |
| 8,526,525 B2 | 9/2013 | Keerthi | |
| 9,813,122 B2 | 11/2017 | Su et al. | |
| 9,825,719 B2 | 11/2017 | Shirakata et al. | |
| 2009/0252251 A1* | 10/2009 | Tosato | H04B 7/0639 375/267 |
| 2012/0328031 A1* | 12/2012 | Pajukoski | H04B 7/0469 375/259 |
| 2014/0093005 A1* | 4/2014 | Xia | H04B 7/066 375/267 |
| 2014/0286464 A1 | 9/2014 | Nasrabadi et al. | |
| 2016/0344460 A1* | 11/2016 | Frank | H04B 7/0632 |
| 2016/0377705 A1* | 12/2016 | Zack | G01S 13/0209 342/21 |
| 2017/0187109 A1 | 6/2017 | Wang et al. | |
| 2017/0272284 A1* | 9/2017 | Gresset | H04L 25/03898 |
| 2018/0241456 A1* | 8/2018 | Nilsson | H04B 7/0619 |
| 2018/0278309 A1* | 9/2018 | Raghavan | G06F 1/206 |
| 2019/0222275 A1* | 7/2019 | Mo | H04B 7/0482 |

(Continued)

*Primary Examiner* — Asad M Nawaz
*Assistant Examiner* — Najeeb Ansari
(74) *Attorney, Agent, or Firm* — Fletcher Yoder PC

(57) ABSTRACT

Wireless network interfaces that are capable of transmitting and/or receiving beamformed radiofrequency (RF) signals may be assisted by the use of codebooks. Electronic devices with memory to store a database of codebooks may be used to increase the number of entries available for operation. The database of codebooks may employ environmental parameters to improve efficiency of the wireless network interface. Methods for calibration of electronic devices and/or adjustment and selection of codebooks based on the parameters are also described. The calibration may employ a testing chamber that measure powers at in a limited number of angles.

20 Claims, 9 Drawing Sheets

(56) References Cited

U.S. PATENT DOCUMENTS

| | | | |
|---|---|---|---|
| 2019/0349045 A1* | 11/2019 | Varatharaajan | H04B 7/0469 |
| 2020/0007200 A1* | 1/2020 | Schreck | H04B 7/0417 |
| 2020/0021349 A1* | 1/2020 | Chapman | H01Q 1/245 |
| 2020/0053575 A1* | 2/2020 | Raghavan | H04B 7/0617 |
| 2020/0100191 A1* | 3/2020 | Raghavan | H04B 17/382 |

* cited by examiner

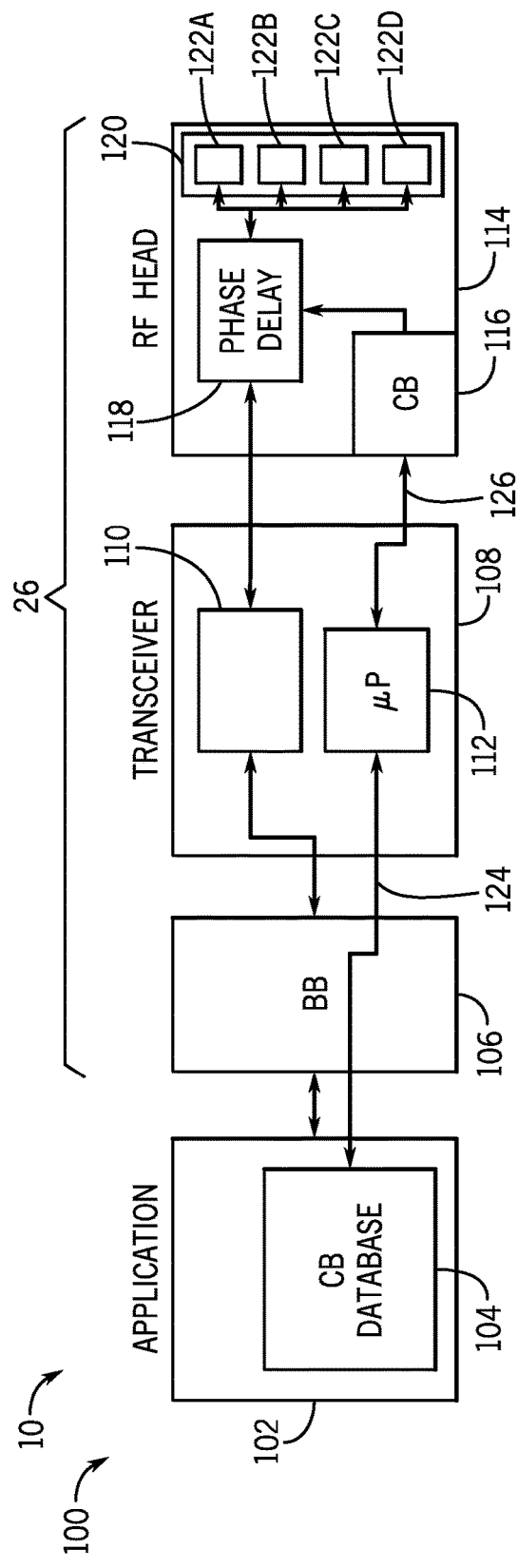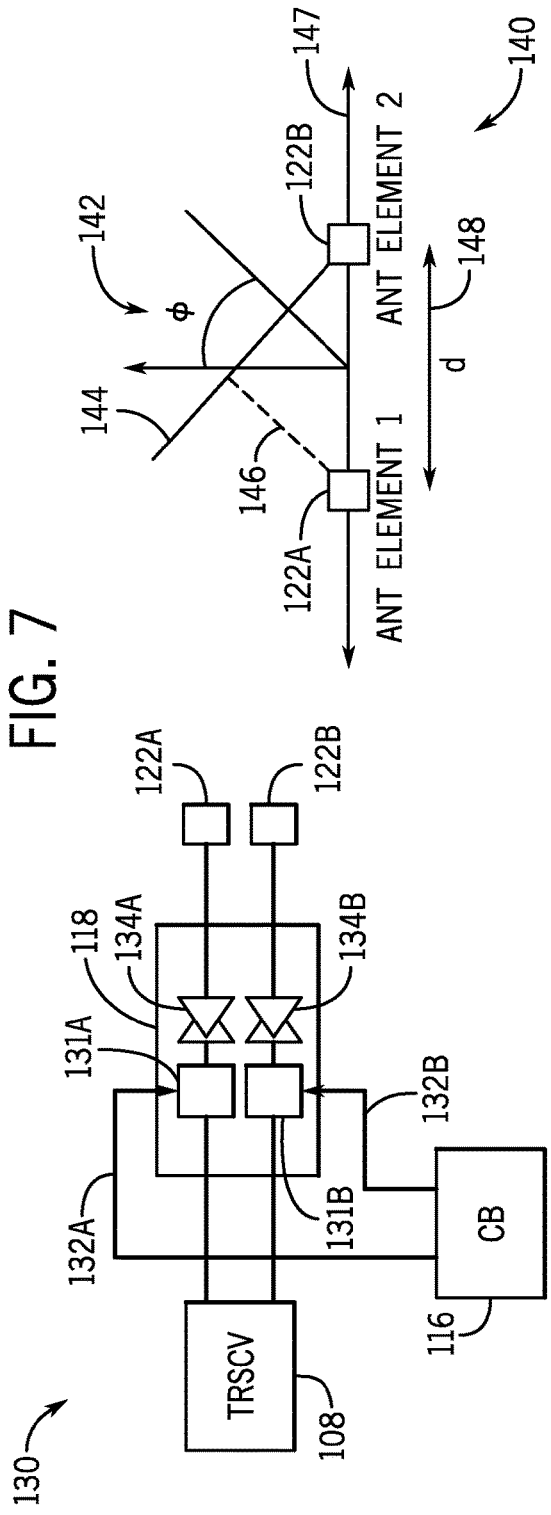
FIG. 7
FIG. 8
FIG. 9

DYNAMIC ANTENNA WEIGHT VECTOR CODEBOOKS

BACKGROUND

The present disclosure relates generally to wireless communication systems and, more specifically, to multi-antenna systems capable of beamforming.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various electrical devices use wireless communication systems for exchanging data and/or forming networks. For example, laptops, mobile phones, and other similar devices may have wireless network adaptors that can connect to cellular networks, wireless Ethernet networks, Bluetooth networks, and others. In some devices, the wireless communication systems may employ multi-input multi-output (MIMO) antenna setups, which may include an array of antennas, to access a radio frequency (RF) channel. In such systems, the transceiver and/or the RF head circuitry that generates the RF signals to the antenna and/or receives the RF signals from the antenna may be capable of providing some directionality. For example, the programming of delays in the RF signals may be used to introduce a phase delay between antennas of the antenna array, which may create an interference pattern that leads to a preferred direction of the RF wave from the antenna. The use of such capabilities may lead to an increase in signal strength and signal-to-noise ratios in the communications channel and may allow reduced power consumption and/or increase effective bandwidths.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Wireless systems may be capable of using beamforming techniques to generate radiofrequency (RF) signals based on a preferential direction or orientation. These systems may employ programmable phased antennas having delay elements or phase configuration elements that may assist in generating the RF wave with the preferential direction. The embodiments described herein relate to methods of using programmable delay elements (e.g., delay components, delay) in phased antenna array systems. The programming of the delay components may be facilitated by the use of codebooks, data structures that may record relationships between the shape of an RF signal and a configuration of the phased antenna system.

In an embodiment, a method for assembly of a codebook database is disclosed. The method generally relates to measuring the power of a beamformed RF signal formed using a pre-generated entry of a codebook, measuring the power of individual RF signals generated by the individual antenna elements using the same pre-generated entry to determine an upper bound for the power, and calculating a power difference between the beamformed RF signal and the upper bound. The difference may be stored in a modified codebook (e.g., a grouped codebook). Modified codebooks may be stored in the codebook database.

In another embodiment, an electronic device is disclosed. The electronic device may have a codebook database in its memory. The electronic device may also have RF circuitry with an antenna array and phase delay circuitry that may be used to generate beamformed RF signals using the antenna array. The RF circuitry may also have an active codebook that was selected from the codebook database. The selection process may take place by a process that involves measuring the power of a beamformed RF signal formed by an entry of a codebook, measuring the power of individual RF signals generated by the individual antenna elements using the same codebook entry to determine an upper bound for the power, and calculating a power difference between the beamformed RF signal and the upper bound for the power. Based on the power difference, the active codebook may be selected.

In another embodiment, an electronic device is disclosed. The electronic device may have a memory that stores a codebook database. The electronic device may also include wireless components of the wireless system that are in communication with the antenna array (e.g., the transceiver, the RF head, the FEM). The available memory in these components may be limited, which may impose a limitation in the number of entries available in the codebook. Moreover, certain parameters such as the carrier frequency (i.e., the frequency of the RF carrier wave), the antenna power, or the antenna temperature, may benefit from alterations in the entries of the codebook.

BRIEF DESCRIPTION OF THE DRAWINGS

Various aspects of this disclosure may be better understood upon reading the following detailed description and upon reference to the drawings in which:

FIG. 7 is a schematic block diagram of an RF communication system that may be used in the electronic device of FIG. 1 and may access a codebook database, in accordance with an embodiment;

FIG. 8 is a schematic block diagram that illustrates the use of codebooks to program phase delays in an RF communication system, in accordance with an embodiment;

FIG. 9 is a schematic diagram that illustrates a relationship between the programmed phase delays, illustrated in FIG. 8, and the beamforming process, in accordance with an embodiment;

DETAILED DESCRIPTION OF SPECIFIC EMBODIMENTS

Figure 1:
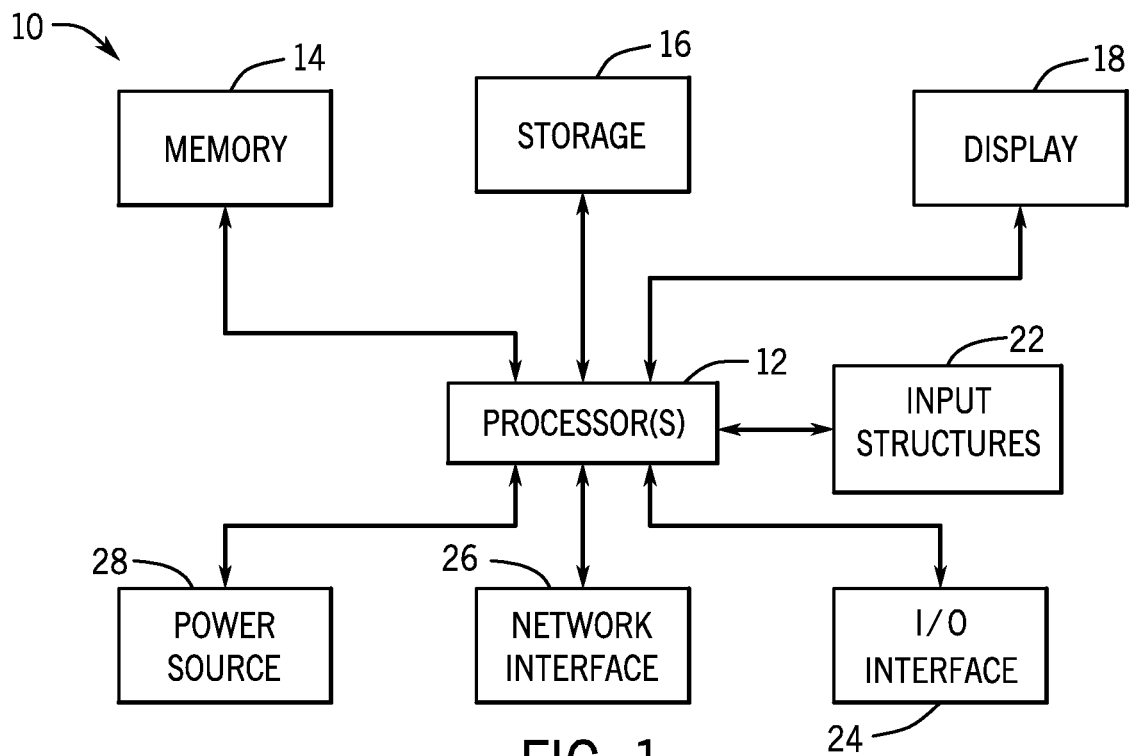
FIG. 1 is a schematic block diagram of an electronic device that may benefit from the use of radio frequency (RF) communication system that employ codebooks for beamforming, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many types of electronic devices may access wireless networks to exchange data with other electronic devices. These wireless networks, which may include cellular networks (e.g., 4G standards such as Long Term Evolution or LTE, 5G standards such as New Radio or 5G NR) and/or connectivity networks (e.g., IEEE 802.3 or WiFi, Bluetooth), may be implemented by establishing radio frequency (RF) connections between electronic devices. In order to establish the wireless RF connection, the electronic devices may include RF communication systems, which may include transmission and reception circuitry coupled to an antenna. The circuitry may include a transceiver module, which may perform encoding/decoding and modulation/demodulation tasks, as well as digital-to-analog and analog-to-digital conversion. The transceiver module may be coupled to the antenna by a front-end module (FEM) or RF head, which may provide filtering and/or power amplification capabilities to the RF communication system. The RF head circuitry may be coupled to an antenna array. The transceiver circuitry and/or the RF head circuitry may generate RF signals that drive the antenna array and/or decode signals received by the antenna array.

Certain wireless network adaptors may be capable of beamforming through the antenna array system. Examples include multi-input multi-output (MIMO) network adaptors. In such system, the transceiver circuitry and/or the RF circuitry may insert delays in the signals that drive the antennas individually. These delays may introduce phase differences between the RF signals emitted by each antenna. Due to the superposition of the RF waves emitted by each antenna, the resulting wave pattern (i.e., the resulting RF wave generated by the superposition of all waves of each antenna) may have a directionality. Thus, the careful selection of delays, based on one or both of the carrier frequency (e.g., the band of the carrier of the signal) and the relative location of the antennas, may allow an electronic device to optimize the signal in a preferential direction.

The embodiments described herein relate to methods to generate and/or use programmable delay elements (e.g., delay components, phase programming elements) in phased antenna array systems. In several devices, the programming of the delay components may be facilitated by the use of codebooks. As discussed herein, the term "codebook" or "codebooks" may refer to data structures that may record relationships between a preferential direction and the phase delays to be programmed in the programmable delay circuitry.

In some embodiments, the codebook data structure may be a table and/or a function that relates a direction with programmable delays. The codebook data structure may be stored in the memory of components of the wireless system that are in communication with the antenna array (e.g., the transceiver, the RF head, the FEM). The available memory in these components may be limited, which may impose a limitation in the number of entries available in the codebook or, more generally, in the size of the codebook. Moreover, certain parameters such as the carrier frequency (i.e., the frequency of the RF carrier wave), the antenna power, or the antenna temperature, may benefit from alterations in the entries of the codebook.

As a result, the limitation in the number of entries in the codebook may prevent the RF system from operating in an efficient manner. For example, a limitation in the number of preferential directions available via the available codebook may reduce the power saving and data rate improvement due to RF beamforming. An absence of adjustments in the transmission frequency may lead to incorrect phase delays in the phase delay circuitry. The absence of adjustments due to temperature may lead to changes in the effective direction of the beamformed RF signal. In order to overcome the limitation in the number of codebook entries, the embodiments described herein are directed to systems and methods that may employ multiple codebooks for a device to overcome the memory limitations, as described below. Embodiments may employ multiple codebooks that may be located in a memory of the electronic device. New codebooks may be loaded to the RF head and/or the transceiver circuitry dynamically, during operation based on changes to conditions and/or changes to the beamformed RF signal direction.

In some embodiments, the codebook is generated by a simulation process or a calculation that is based on a geometric disposition of an antenna. However, due to variations during the production process, such simulations or calculations may benefit from adjustments within a respective device. To that end, the present application also discusses a method in which the device may correct a pre-loaded codebook during device testing and/or during operation. Such system may mitigate any mismatches between the simulation or calibration used to generate the pre-loaded codebook, and the performance of the electronic device.

With the foregoing in mind, there are many suitable electronic devices that may employ codebooks to generate beamformed RF signals and may benefit from the embodiments described herein. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
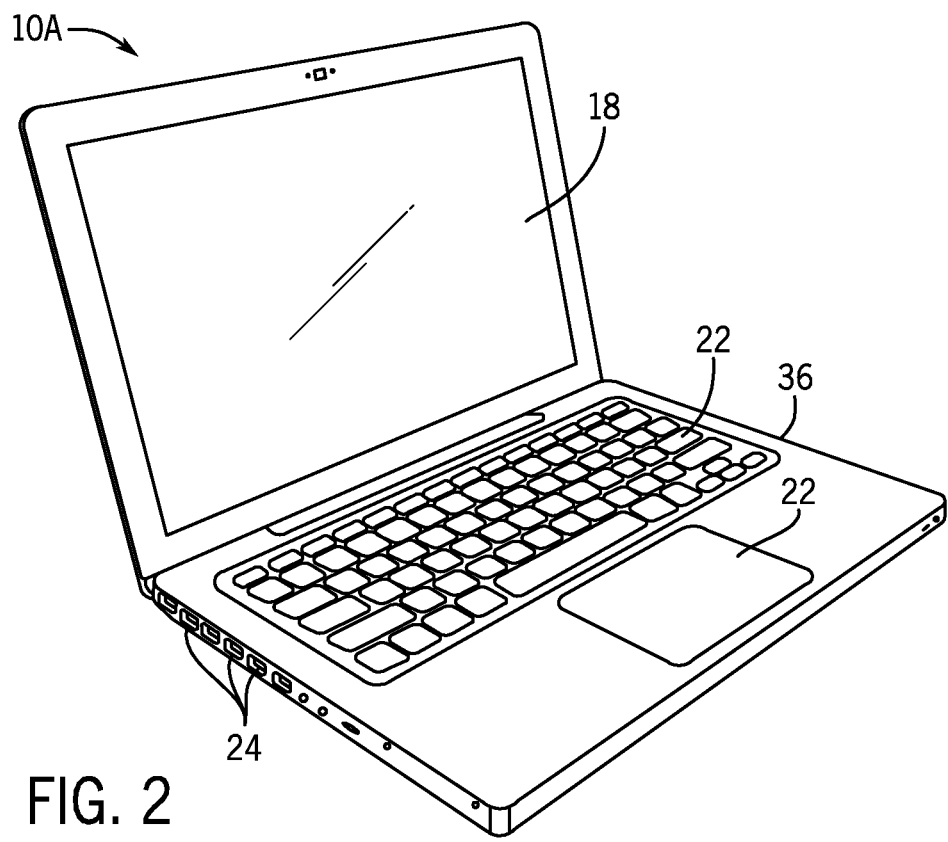
FIG. 2 is a perspective view of a notebook computer representing an embodiment of the electronic device of FIG. 1.
Figure 4:
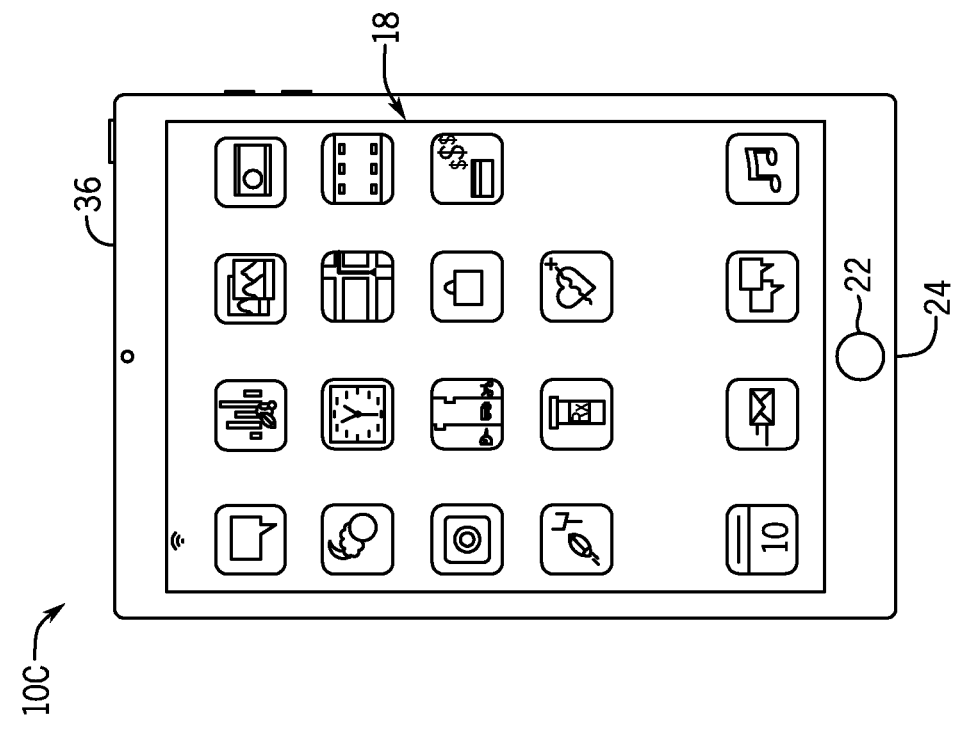
FIG. 4 is a front view of another hand-held device representing another embodiment of the electronic device of FIG. 1.
Figure 3:
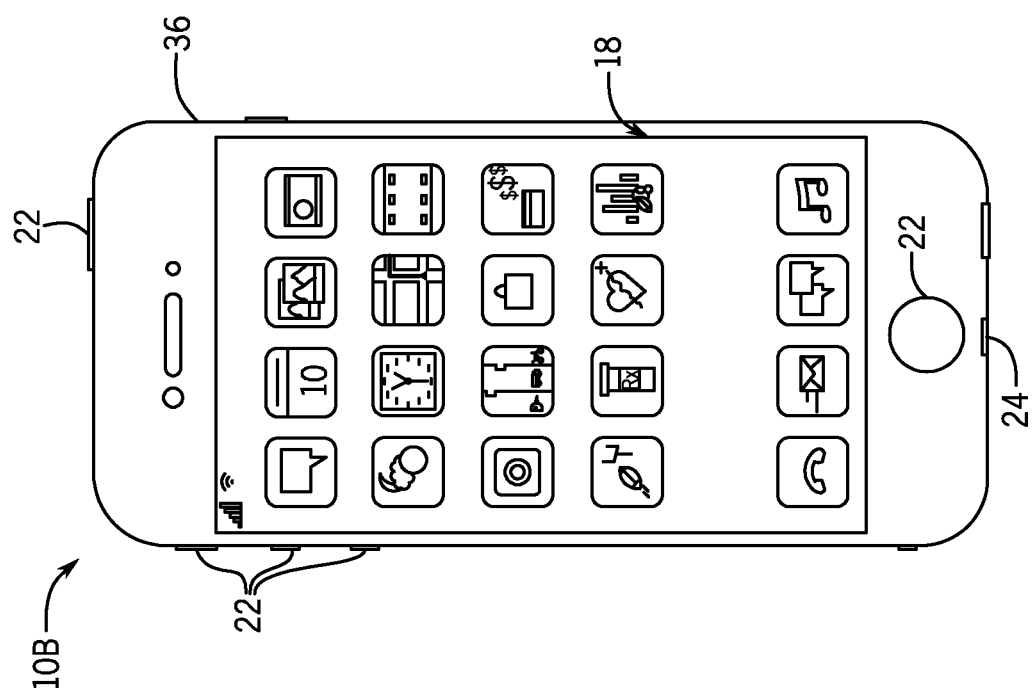
FIG. 3 is a front view of a hand-held device representing another embodiment of the electronic device of FIG. 1.
Figure 5:
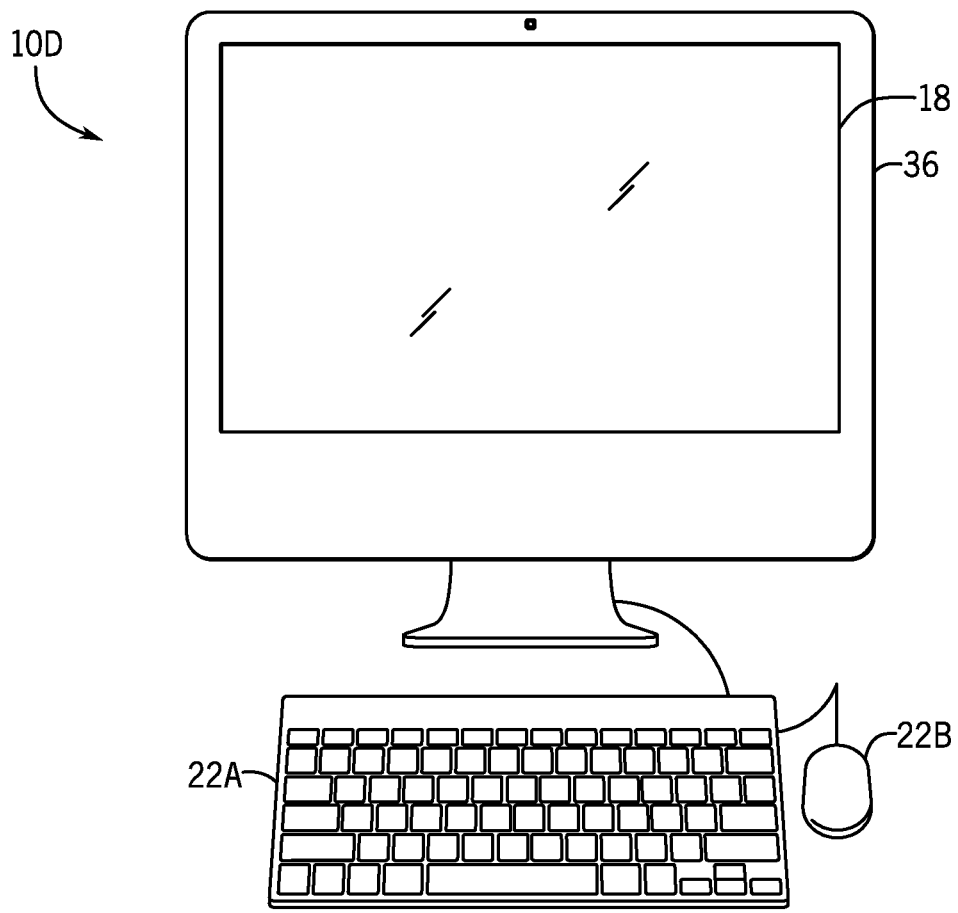
FIG. 5 is a front view of a desktop computer representing another embodiment of the electronic device of FIG. 1.
Figure 6:
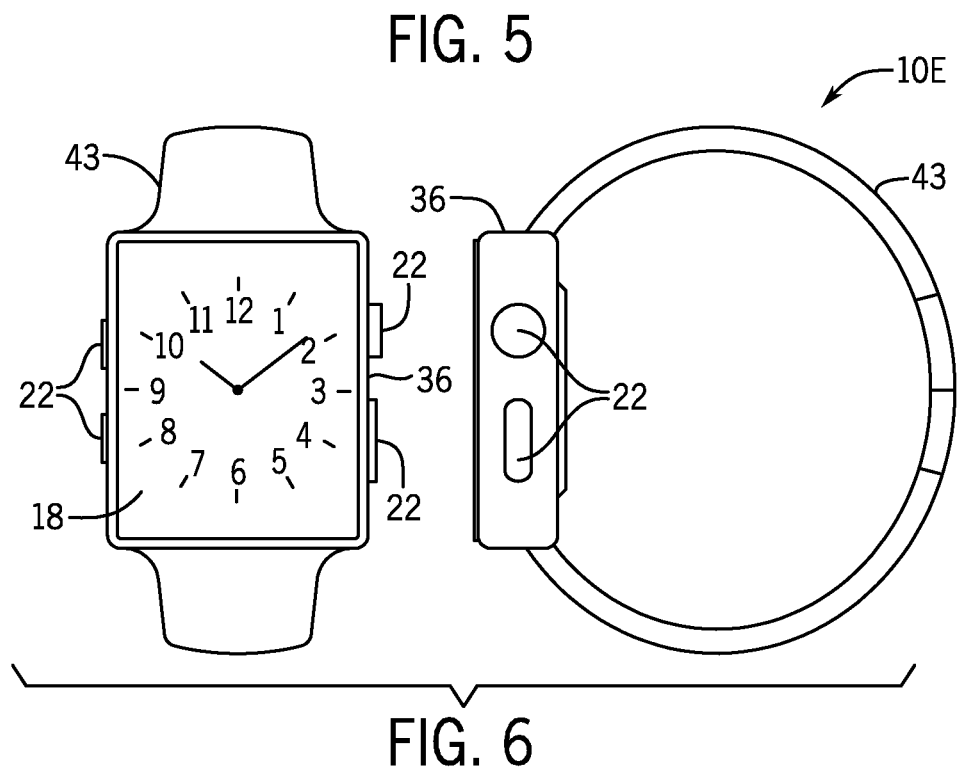
FIG. 6 is a front view and side view of a wearable electronic device representing another embodiment of the electronic device of FIG. 1.

By way of example, the electronic device 10 may represent, by block diagram, devices such as the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, or long term evolution license assisted access (LTE-LAA) cellular network, 5th generation (5G) cellular network, and/or 5G New Radio (5G NR) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For example, network interfaces 26 may include circuitry for accessing wireless networks and may include, by way of example, RF transceivers, front-end modules, and/or phased antenna arrays capable of generating beamformed RF signals. In some embodiments, the network interfaces 26 may support MIMO features. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may be used to obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

The block diagram 100 of FIG. 7 illustrates a wireless network interface 26 in an electronic device 10 that may employ dynamic codebooks as discussed herein. The electronic device 10 may include application circuitry 102 (e.g., one or more processors 12 that may perform instructions loaded from a memory 14). The application circuitry 102 may include a codebook database 104. As discussed herein, the codebook database 104 may contain one more codebooks, which may be dynamically retrieved and loaded in the network interface 26 based on measured parameters (e.g., environmental parameters) or configured parameters (e.g., frequency, nominal transmission power) of the electronic device 10.

The network interface 26 may include a baseband circuit 106 that may include baseband filters and other baseband processing functionality. The network interface 26 may also include a transceiver 108. The transceiver 108 may include one or more encoder/decoders 110. The encoder/decoder 110 may, among other things, add a carrier signal to an outgoing RF signal and/or generate a baseband signal from an incoming RF signal. In some embodiments, the transceiver 108 may have processing circuitry 112. The processing circuitry 112 may be, by way of example, a general-purpose processor, a dedicated logic, a microcontroller, or other suitable circuitry capable of executing code. The processing circuitry 112 may, among other things, manage the codebooks loaded in the network interface 26.

The wireless network interface 26 may also include RF head circuitry 114. The RF head circuitry 114 may include dedicated memory for storage of an active codebook 116. As discussed above, the active codebook 116 may store programming instructions for phase delay circuitry 118. The RF head circuitry 114 may also include or be connected to an antenna array 120, which may include antenna elements 122A, 122B, 122C, and 122D.

In the illustrated system, the processing circuitry 112 may access the codebook database 104 via a codebook bus 124. The codebook bus 124 may be tunneled through the baseband, and may be a dedicated bus for codebooks or a shared data bus. The processing circuitry may also interact with the active codebook 116 via codebook bus 126. The codebook bus 126 may be a dedicated bus for codebooks or a shared data bus. The codebook buses 124 and 126 may provide a fast channel for transference of codebooks (e.g., loading codebooks from codebook database 104 to the memory within the RF head circuitry 114 that stores the currently active codebook 116). In some embodiments, the channel between the codebook database 104 and the storage or memory location designated for the active codebook 116 may be a single connected bus that is managed by the microprocessor 112.

As discussed above, the active codebook 116, the phase delay circuitry 118 and the antenna array 120 may operate in coordination to generate and/or receive beamformed RF signals. For example, the processing circuitry 112 may identify a preferred direction for the emitted beamformed RF signal and, based on the preferred direction, program the phase delay circuitry 118 based on delay settings retrieved from the active codebook 116. The programmed phase delay circuitry 118 will generate phase-delayed RF signals for each antenna element 122A, 122B, 122C, and 122D. The diagrams in FIGS. 8 and 9 provide an illustration of the beamforming operation for a system with two antenna elements. The diagram 130 of FIG. 8 illustrates a system with the transceiver 108, the phase delay circuitry 118 with delay elements 131A and 131B, two antenna elements 122A and 122B, and an active codebook 116. The active codebook 116 may program the delay elements 131A and 131B using control signals 132A and 132B, respectively. The delay elements may generate a phase difference between the RF signals that arrive at antenna elements 122A and 122B. In the illustrated system, the phase delay circuitry may also include amplifiers 134A and 134B and, in some embodiments, the amplifiers may also be controlled in the process of beamforming.

The diagram 140 in FIG. 9 provides an illustration of a beamformed wavefront, which may be used to calculate phase delays. In the diagram 140, antenna elements 122A and 122B generate an RF signal that may have a preferred direction with a wavefront line 144 (e.g., the maximum amplitude of the RF signal may be in a direction perpendicular to wavefront line 144). The wavefront line 144 may form an angle 142 with a line 147, in which the antenna elements 122A and 122B are located. In order to obtain the wavefront line 144, the antenna elements 122A and 122B may radiate individual RF signals with a phase difference, which may be generated in the phase delay circuitry 118, as discussed above. The relationship between the time delay imposed in the phase delay circuitry 118 and the wavefront line 144 may be determined as follows. In view of the angle 142 and a distance 148 that separates the antenna elements 122A and 122B, a delay distance 146 may be determined. Based on the delay distance 146 and the frequency of the RF frequency irradiated by the antenna elements 122A and 122B, the delay may be calculated.

As discussed above, the space for the active codebook 116 in the network device 26 of FIG. 7 may be limited, due to limitations in the space (e.g., floorplan) of the RF head circuitry 114 and/or in the transceiver 108. The limitations in the space may lead to a limited number of entries available in the active codebook 116. Each codebook entry (e.g., set of delays) may be associated with a preferential direction (e.g., azimuth and elevation angles), the transmission frequency of the RF signal (e.g., frequencies in 450 MHz band, 800 MHz band, 850 MHz band, 900 MHz band, 1.8 GHz band, 1.9 GHz band, 2.4 GHzband, 3.65 GHz band, 4.9 GHz band, 5 GHz band, millimeter wave (mmWave) frequencies such as frequencies in 36-40 GHz band, 71-76 GHz band, 81-86 GHz band, and 92-95 GHz band), the temperature of the antenna elements, the power levels of the transceiver circuitry, the mode of operation of the transceiver circuitry (e.g., transmitting, receiving), and other parameters. In order to overcome the memory limitation in the active codebook 116, a codebook from the codebook database 104 having different entries than the active codebook 116 may be loaded into the RF head circuitry 114 to replace the active codebook 116. In the illustrated embodiment, the processing circuitry 112 of the transceiver 108 may perform the dynamic replacement.

Figure 10:
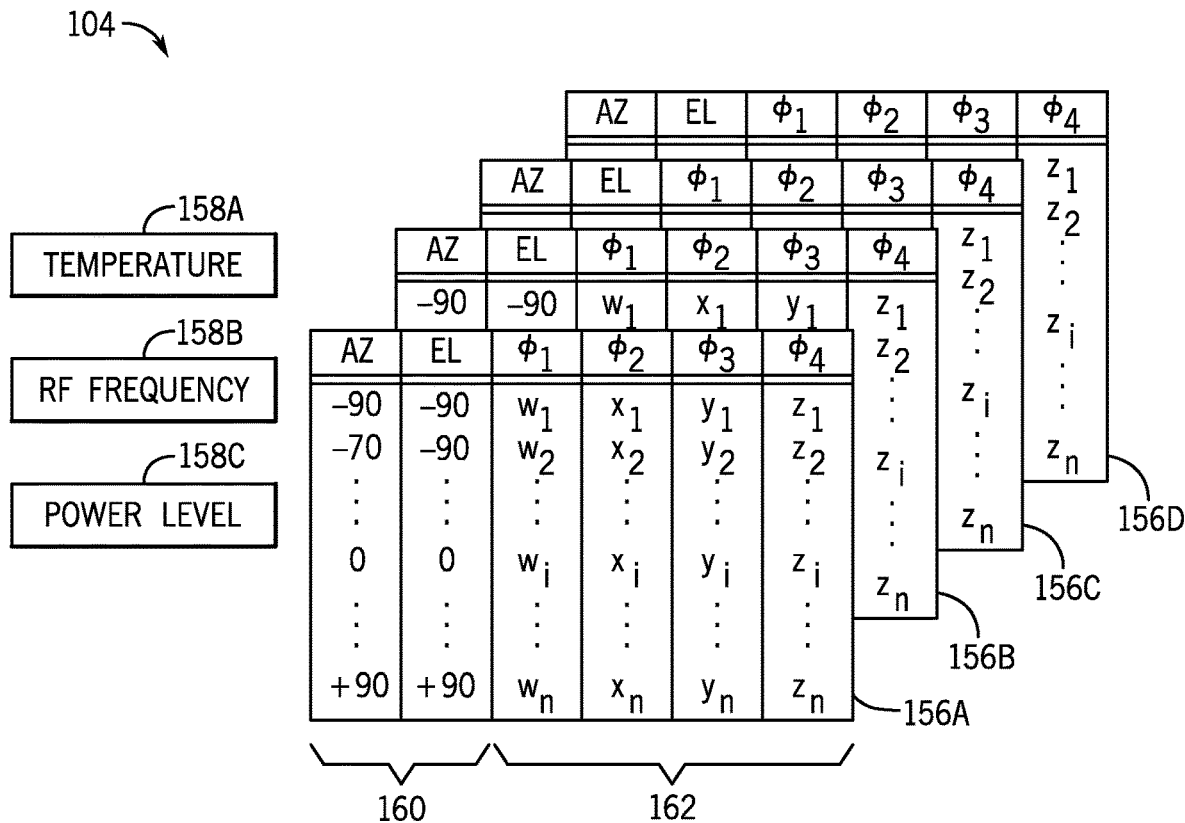
FIG. 10 is a diagram of a codebook database, in accordance with an embodiment.

An example of a codebook database 104 is illustrated in FIG. 10. The codebook database 104 may include multiple codebooks, such as codebooks 156A, 156B, 156C, and 156D. Each codebook 156A-D may include entry keys 160, which in the example illustrated in FIG. 10 include azimuth angle and elevation angle. The codebook 156A-D may also include the delay values 162. The number of delay values may be associated with the number of antennas elements (e.g., antenna elements 122A-D) in the antenna array (e.g., antenna array 120) such that each antenna element has an associated delay for a given entry in a respective codebook 156. For example, the codebooks 156A-D include 4 delay values per entry. A codebook database 104 may index each codebook based on one or more parameters. In the illustrated codebook database 104, the system may employ as parameters a temperature parameter 158A, an RF frequency parameter 158B, and a power level parameter 158C. The parameters may be used by the network device 26 (e.g., the processing circuitry 112) to retrieve the codebook for active replacement.

The use of a codebook database 104 increases substantially the available space that can be used to store codebooks. In some embodiments, the memory available for the active codebook 116 may be small (e.g., less than 1 Kilobyte) and the memory available for the codebook database may be up to the entire memory in the electronic device (e.g., memory 14 of an electronic device 10, which may be several Terabytes, several Gigabytes, several Megabytes, several Kilobytes etc.).

It should also be noted that the use of a codebook database 104 may allow for quick updates of the active codebook 116. Changes to memory in the RF head circuitry 114 may cause a pause in the RF transmissions and/or receptions. As a result, an update of the active codebook 116 in which phase delays entries are calculated may lead to a substantial idle time. The use of pre-calculated codebooks in a codebook database 104, as discussed herein, may allow the use of a large number of codebook entries without creating significant idle times.

While the example discussed in FIGS. 7 and 10 relate to an antenna array with four elements that may be disposed in a single line, which results in a planar beamforming system), the methods and systems described herein may be adapted to 3-dimensional beamforming systems (e.g., M×N antenna arrays). Moreover, while the codebook database 104 illustrated in FIG. 10 relates to a database indexed by a temperature parameter 158A, RF frequency parameter 158B, and power level 158C, other parameters including directions (e.g., azimuth angle, elevation angle) may also be used. Furthermore, while the codebooks 156A-D illustrated in FIG. 10 includes azimuth and elevation angles as the only entry keys 160, other quantities, such as temperature, RF frequency, and power level may also be added to the codebook and used as key. It should also be noted that the codebook database 104 may refer to a managed database (e.g., a SQL database, a non-SQL database), an indexed file system, or any other suitable data structure capable of storing codebooks in an indexed or otherwise searchable manner.

Figure 11:
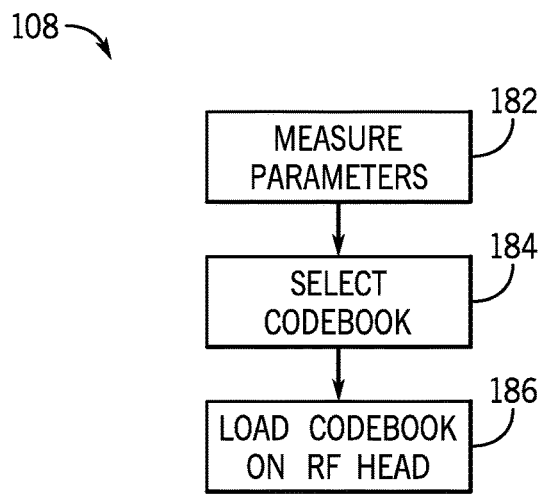
FIG. 11 is a flow chart of a method to load a codebook from a codebook database, in accordance with an embodiment.

With the foregoing in mind, FIG. 11 illustrates a flowchart for a method 180 to load codebooks dynamically. In a process 182, a parameter may be measured and received by a controller in the wireless system (e.g., processing circuitry 112 of the network device of FIG. 7). During operation of the electronic device, sensors may monitor or determine a change in parameter. Examples of sensors include temperature sensors (e.g., thermistors) or movement sensors. Information related to some parameters may be provided by controller circuitry. For example, an encoder in a transceiver (e.g. encoder/decoder 110 in transceiver 108) may provide data indicating the power level and/or the carrier frequency of the RF signal. In this step, the controller may determine whether there was substantial change in the parameter and, based on that determination, determine whether the active codebook (e.g., active codebook 116) should be replaced by a codebook from the codebook database (e.g., codebook database 104). In a process 184, the controller may request an appropriate codebook based on the measured parameters. In a process 186, the retrieved codebook may be loaded and used to program phase delay circuitry to improve the process of beamforming.

As discussed above, an electronic device may have multiple codebooks in a codebook database 104 that may be dynamically loaded to the front-end circuitry of a wireless network adaptor 26 (e.g., transceiver 108, RF head circuitry 114). Furthermore, as discussed above, certain codebooks may be more suitable to be employed in different conditions. For example, an electronic device may have one codebook for a set of ranges of temperature, RF signal frequencies, power levels, and/or beamforming angles. The codebooks in the codebook database 104 may be calculated using simulations and/or measurements based on the design of the process. Simulations may include numerical simulations and/or evaluation of analytical formulas. Measurements may be made in an appropriate setting that in which the shape of beamformed RF emissions from an electronic device under testing (DUT) can be measured under different conditions (e.g., temperature, RF power, RF frequency). The shape of the beamformed RF emission may take place by measuring the power in multiple directions and charting the measured powers associated with each direction. The generated codebook database 104 may be loaded into the memory of the electronic device.

The fabrication process may create devices with slight deviations in the dimensions and/or positions of the antenna elements. As a result, the preloaded codebook database 104 may provide different results from the ones obtained in simulation or measurement. Moreover, the expense and the time for conventional testing of the beamformed RF emissions for all fabricated electronic devices may be significantly high and, in some situations, prohibitive. A streamlined process for adjusting the codebooks in the codebook database 104, which employs a simplified calibration chamber illustrated in FIG. 12, is described below in FIGS. 13, 14, 15, and 16.

In general, the described process may take place by generating a database of enhanced and/or grouped codebooks from a sampling of test devices. These enhanced and/or grouped codebooks may include characteristics that may provide a "signature" characteristic to a codebook. A "signature" characteristics may be a characteristic that indicates that a device may be similar to another device. As an example, the "signature" characteristic may be a difference between an effective power and an upper-bound power measured at a fixed angle, as detailed below. That is, two devices that have similar a "signature" characteristic may successfully share a common codebook. Therefore, following a fabrication, a streamlined calibration process that measures the "signature" characteristic may be used to select one or more appropriate codebooks from the codebook database for that device.

Figure 12:
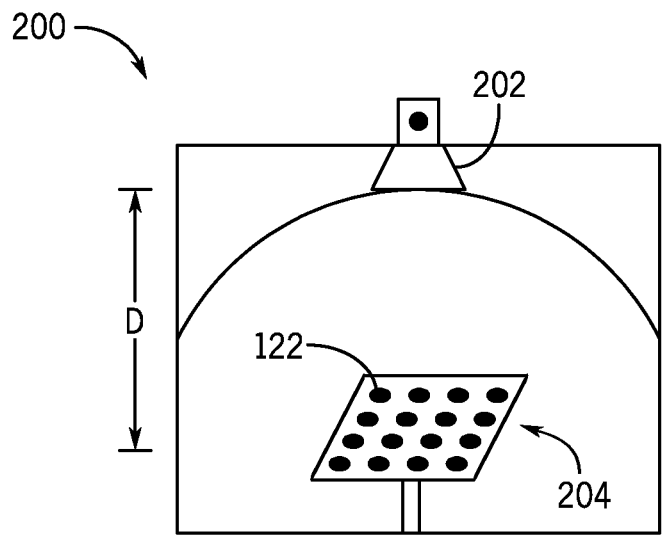
FIG. 12 is a schematic diagram of a fixed angle testing chamber that may be used to perform codebook correction and/or selection, in accordance with an embodiment.

The diagram of FIG. 12 illustrates a testing chamber 200 for performing streamlined calibration during and/or following manufacturing. The testing chamber 200 may have a measurement antenna 202, which may be connected to a measurement instrument. The measurement antenna 202 may measure the RF power from a device in a DUT fixture 204. In the illustrated example, the DUT fixture 204 holds an electrical device, which is represented schematically and which has a 4×4 antenna array, with antenna elements 122. In some embodiments, the testing chamber 200 may be fixed, and the measurement antenna 202 measures the RF power at a fixed direction (e.g., azimuth at 0 degrees, elevation at 0 degrees). The testing chamber 200 may also have sensors and/or other circuitry to record testing parameters such as the temperature, humidity, emitted power, etc. The testing chamber 200 may be used to measure the performance of codebook entries at the fixed direction, with the results being used to compare with previously measured codebook entries as discussed above.

Figure 13:
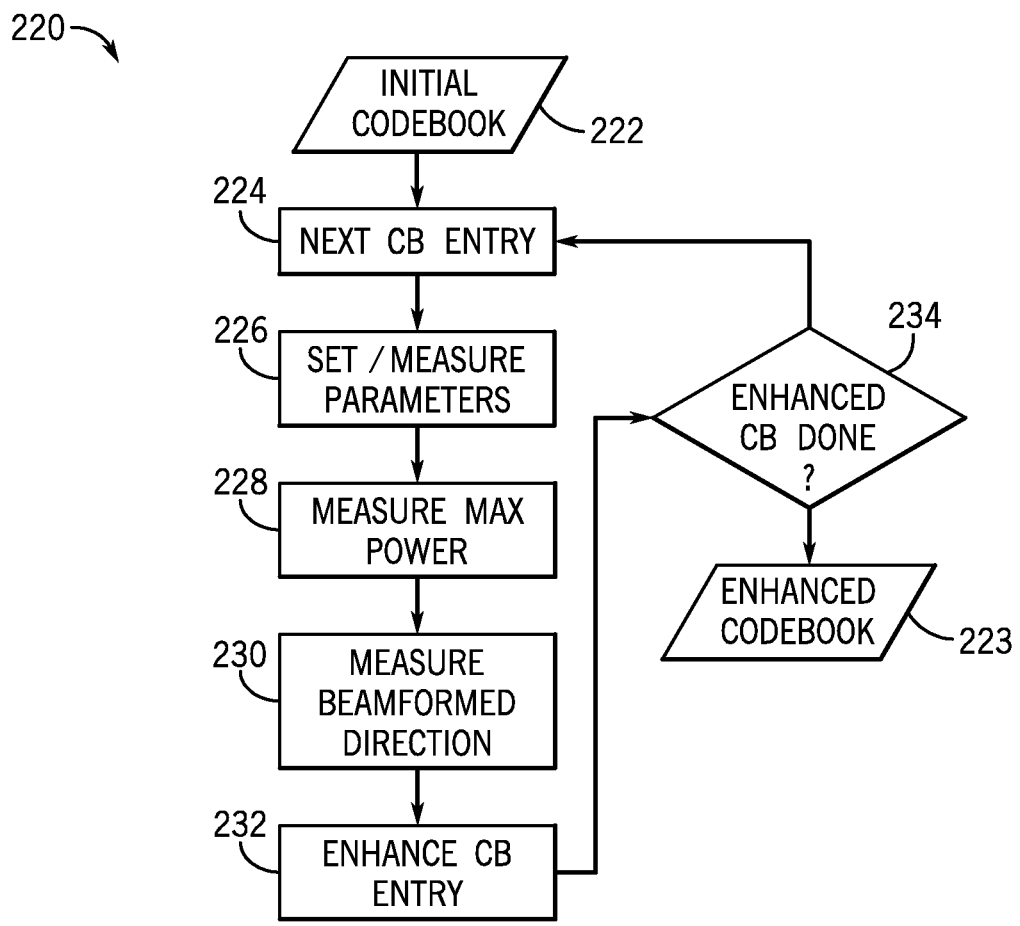
FIG. 13 is a flow chart of a method to generate enhanced codebooks, in accordance with an embodiment.

The method 220 of FIG. 13 illustrates steps that may be used to enrich a codebook database 104 in a manner that facilitates the use of the testing chamber 200 during quality fabrication. The method 220 may be used to associate a particular pre-calculated codebook 222 to obtain an enhanced codebook 223. The method 220 may be employed with a limited number of test devices in a conventional test chamber, which may be capable of measuring the shape of the beamformed RF signal (i.e., measuring the power of the RF signal in multiple directions). In method 220, each entry of a particular codebook may be tested in an iteration, as illustrated by process block 224. For each codebook entry, parameters may be set and/or measured in process block 226. Examples of parameters include the RF frequency, the RF power transmission (e.g., nominal RF signal power), and/or the temperature. The maximum power generated may also be measured, in process block 228. The angle of the beamformed RF signal may also be measured in a process block 230. All the entries measured and/or tested may be incorporated into the entry in process block 232. Note that the angle measured in process block 230 may be used to update angle entries of the initial (e.g., pre-calculated) codebook 222. Other entries (e.g., temperature, frequency, nominal transmission power) may be added as additional data (e.g., new columns) in the enhanced codebook 223. The method 220 may proceed until all codebook entries are tested, as illustrated by decision block 234.

Tables 1 and 2, described below, illustrate an example of a pre-calculated codebook 222 and an enhanced codebook 223.

TABLE 1

Pre-calculated codebook

| AZ | EL | $\Phi_1$ | $\Phi_2$ | $\Phi_3$ | $\Phi_4$ |
|---|---|---|---|---|---|
| −90 | −90 | $w_1$ | $x_1$ | $y_1$ | $z_1$ |
| −70 | −90 | $w_2$ | $x_2$ | $y_2$ | $z_2$ |
| . | . | . | . | . | . |
| . | . | . | . | . | . |
| . | . | . | . | . | . |
| −90 | −70 | $w_k$ | $x_k$ | $y_k$ | $z_k$ |
| . | . | . | . | . | . |
| . | . | . | . | . | . |
| . | . | . | . | . | . |
| 0 | 0 | $w_i$ | $x_i$ | $y_i$ | $z_i$ |
| . | . | . | . | . | . |
| . | . | . | . | . | . |
| . | . | . | . | . | . |
| +90 | +90 | $w_n$ | $x_n$ | $y_n$ | $z_n$ |

TABLE 2

Enhanced codebook

| AZ | EL | $\Phi_1$ | $\Phi_2$ | $\Phi_3$ | $\Phi_4$ | Power | Temperature |
|---|---|---|---|---|---|---|---|
| $AZ_1$ | $EL_1$ | $w_1$ | $x_1$ | $y_1$ | $z_1$ | $P_{S1}$ | $T_1$ |
| $AZ_2$ | $EL_2$ | $w_2$ | $x_2$ | $y_2$ | $z_2$ | $P_{S2}$ | $T_2$ |
| . | . | . | . | . | . | . | . |
| . | . | . | . | . | . | . | . |
| . | . | . | . | . | . | . | . |
| $AZ_j = 0$ | $EL_j = 0$ | $w_j$ | $x_j$ | $y_j$ | $z_j$ | $P_{Sj}$ | $T_j$ |
| . | . | . | . | . | . | . | . |
| . | . | . | . | . | . | . | . |
| $AZ_n$ | $EL_n$ | $w_n$ | $x_n$ | $y_n$ | $z_n$ | $P_{Sn}$ | $T_n$ |

Figure 14:
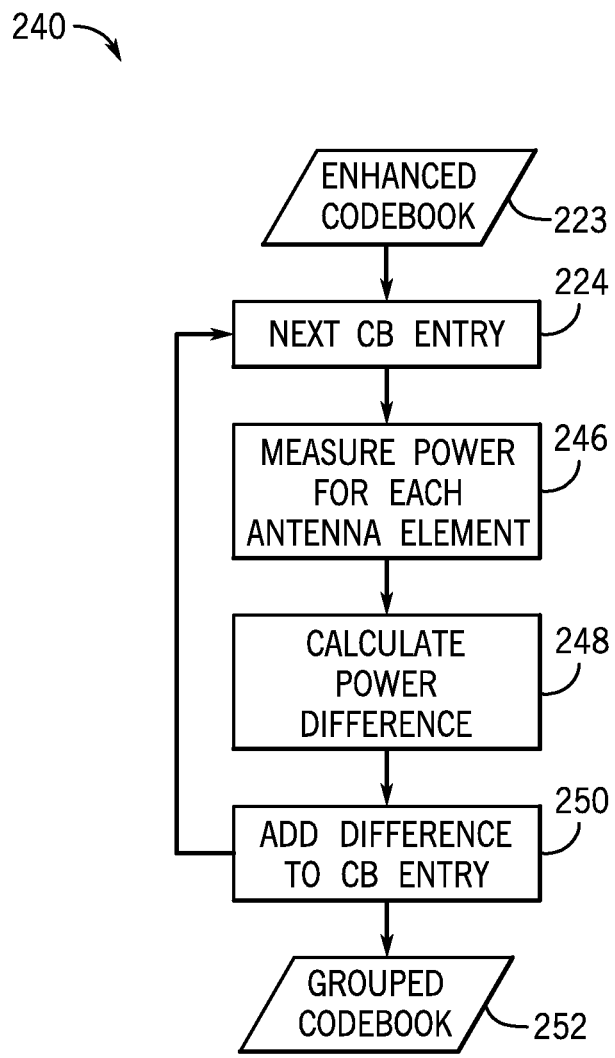
FIG. 14 is a flow chart of a method to generate grouped codebooks, in accordance with an embodiment.
Figure 15:
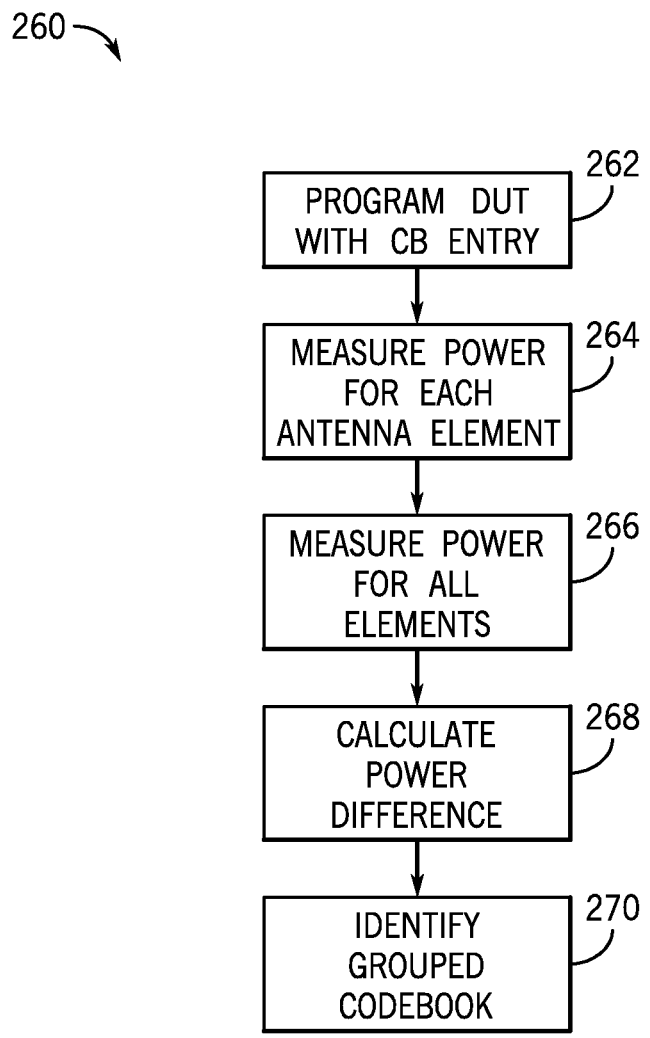
FIG. 15 is a flow chart of a method to select a grouped codebook for a particular electronic device, in accordance with an embodiment.

Following the measurement described in method 220, the enhanced codebooks 223 may be tested in a method 240, of FIG. 14, to calculate a difference value, which may be used as "signature" for a device under test, as detailed below. The present method will be described employing the Table 2 as an example of an enhanced codebook. In method 240, each entry of the enhanced codebook may be tested, as illustrated by process block 244.

In a process block 246, each antenna element may be individually tested by emitting individual RF signals and the associated power at a fixed direction may be measured. The fixed direction may be the maximum power direction or a particular direction that may be convenient for calibration (e.g., a direction associated with test chamber 200 of FIG. 12). For example, when testing the first entry of the enhanced codebook 223 of Table 1, the first antenna element may be programmed with a phase delay $w_1$ and the power at $AZ_1$ and $EL_1$ may be measured as $P_{1,1}$. Similarly, the second antenna element may be programmed with a phase delay $x_1$ and the power at $AZ_1$ and $EL_1$ may be measured as $P_{2,1}$; the third antenna element may be programmed with a phase delay $y_1$ and the power at $AZ_1$ and $EL_1$ may be measured as $P_{3,1}$; and the fourth antenna element may be programmed with a phase delay $z_1$ and the power at $AZ_1$ and $EL_1$ may be measured as $P_{4,1}$. As described herein, $P_{i,j}$ may refer to the power measured in process block 246 associated with the i-th antenna element and the j-th codebook entry. An upper bound power $P_{Uk}$ may be calculated as $P_{Uk} \Sigma_i P_{i,k}$.

In process block 248, a power difference between an upper bound power associated with the codebook entry (measured in process block 246), and the measured power (measured in process block 228 of method 220, and stored in enhanced codebook 223) may be calculated as $\Delta_k = P_{Uk} - P_{Sk}$. The difference may be added to the codebook entry in a process block 250, to obtain a grouped codebook 252. An example of a grouped codebook is illustrated in Table 3.

TABLE 3

Grouped codebook

| $\Delta$ | AZ | EL | $\Phi_1$ | $\Phi_2$ | $\Phi_3$ | $\Phi_4$ | Power | Temperature |
|---|---|---|---|---|---|---|---|---|
| $\Delta_1$ | $AZ_1$ | $EL_1$ | $w_1$ | $x_1$ | $y_1$ | $z_1$ | $P_{S1}$ | $T_1$ |
| $\Delta_2$ | $AZ_2$ | $EL_2$ | $w_2$ | $x_2$ | $y_2$ | $z_2$ | $P_{S2}$ | $T_2$ |
| . | . | . | . | . | . | . | . | . |
| . | . | . | . | . | . | . | . | . |
| . | . | . | . | . | . | . | . | . |
| $\Delta_j$ | $AZ_j = 0$ | $EL_j = 0$ | $w_j$ | $x_j$ | $y_j$ | $z_j$ | $P_{Sj}$ | $T_j$ |
| . | . | . | . | . | . | . | . | . |
| . | . | . | . | . | . | . | . | . |
| . | . | . | . | . | . | . | . | . |
| $\Delta_n$ | $AZ_n$ | $EL_n$ | $w_n$ | $x_n$ | $y_n$ | $z_n$ | $P_{Sn}$ | $T_n$ |

The testing of the device may present a set of differences (e.g., $\Delta = \{\Delta_1, \Delta_2, \ldots, \Delta_n\}$). As some devices may have similar set of differences $\Delta$, the set of differences may be used as a signature to identify a grouped codebook 252 for a particular device during a streamlined calibration process during or after production. To that end, all grouped codebooks 252 that were identified may be loaded in the codebook database 104 that is loaded in the memory of the electronic device. The method 260 of FIG. 15 may be used in the factory setting to identify which grouped codebook 252 should be employed by the device. The method 260 may be suitable to be used in the test chamber 200 with a fixed angle measurement, and illustrated in FIG. 12.

In a process block 262, a particular codebook entry may be loaded. The codebook entry loaded may be associated with the fixed direction of the test chamber (e.g., test chamber 200). In a process block 264, each antenna element may be independently tested, in a process that may be similar to the process block 246 in method 240. The sum of the powers of the RF signals from each antenna element may be the upper bound power $P_{U,test}$, as discussed above. In a process block 266, the power of the RF signals from all antennas $P_{S,test}$ may be calculated in a process that may be similar to the process block 228 in method 220. In a process block 268, a difference $\Delta_{test}$ may be calculated, in a manner similar to that of process block 248. That value of $P_{U,test}$, $P_{S,test}$, or $\Delta_{test}$ may be used to identify group membership for grouped codebook 252 in a process 270. In some embodiments, that may take place by identifying which group in the codebook database is most similar to the grouped codebook 252 based on the measurements. In some embodiments of the method 260, the chosen grouped codebook 252 may be checked by verifying the equation $P_{Sj} = P_{U,test} + \Delta_j + \tau$, in which $\tau$ may be a tolerance margin. The application of method 260 may, thus, allow a streamlined process for identification and adjustment of suitable codebooks using a test chamber with fixed angle of observation.

Figure 16:
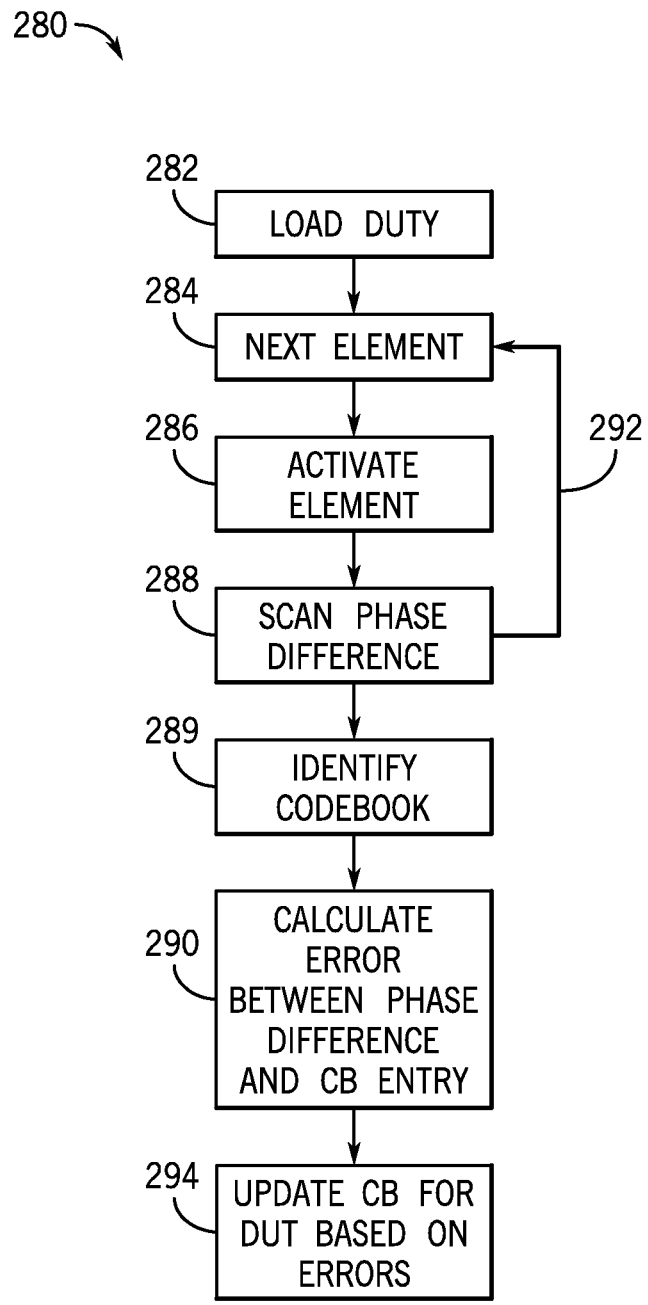
FIG. 16 is a flow chart of a method to adjust a pre-calculated codebook, in accordance with an embodiment.

In some embodiments, the identification of a suitable codebook may be performed with a method 280, illustrated in FIG. 16. Method 280 may be employed in place of method 260, or performed in situations in which method 260 is not capable of identifying an appropriate grouped codebook 252. The method 260 may be suitable to be used in the test chamber 200 with a fixed angle measurement, and illustrated in FIG. 12. In process block 282, the DUT may be loaded to the test chamber 200. An iterative process that tests each element may be employed, as illustrated by process block 284. In the iterative process, each element may be sequentially activated, in process block 286. The sequential activation may be one in which previously tested antenna elements may remain activated. A phase scan may be performed in process block 288, to determine a delay value for the antenna element that provides the maximum power at the fixed angle. At the end of the iteration, a set of delay values that maximize the power at the fixed angle may be identified.

An example of an iteration that involves process blocks 284, 286, and 288 is provided as follows. In a first iteration, the first antenna element is activated and a phase value $\phi_1$ may be determined with a phase scan. In the second iteration, the first element is programmed to use the phase value $\phi_1$, and the second element is activated. The phase scan of the phase delay associated with the second element may return the phase value $\phi_2$. Subsequent steps may provide a sequence of phase values $\phi_1, \phi_2, \ldots, \phi n$. A codebook from the codebook database 104 that has a sequence that approximates $\phi_1, \phi_2, \ldots, \phi_n$ associated with the fixed angle may be chosen in process block 289. In order to determine which sequence approximates the phase values, a metric (e.g., Euclidian difference, Manhattan difference, etc.) may be used.

In process block 290, the codebook may be adjusted by calculating an array of errors in the phase setting. The errors may be determined as the difference $e = (e_1, e_2, \ldots, e_n) = (x_1, x_2, \ldots, x_n) - (\phi_1, \phi_2, \ldots \phi_n)$ between the codebook entry and the phase values measured in method 280. In a process block 294, the codebook may be updated based on the errors measured in process block 290. This correction may be an addition of the difference vector e to all entries in the codebook. An example of process blocks 290 and 294 are described as follows. Assume an implementation of method 280 in which $\phi_1, \phi_2, \ldots, \phi_4$ are the phase values identified for a device with 4 antenna elements in a chamber with AZ=0 and EL=0. Furthermore, let the codebook identified in process block 289 be the codebook represented in Table 1 above, in which $w_i$, $x_i$, $y_i$, and $z_i$ are the delay values associated with AZ=0 and EL=0. The errors may be calculated as $e_1 = w_1 - \phi_1$, $e_2 = x_1 - \phi_2$, $e_3 = y_1 - \phi_3$, and $e_4 = z_1 - \phi_4$ in process block 290. In process block 294, the error values may be used to create a corrected codebook illustrated in Table 4.

TABLE 4

Corrected codebook

| AZ | EL | $\Phi_1$ | $\Phi_2$ | $\Phi_3$ | $\Phi_4$ |
|---|---|---|---|---|---|
| −90 | −90 | $w_1 + e_1$ | $x_1 + e_2$ | $y_1 + e_3$ | $z_1 + e_4$ |
| −70 | −90 | $w_2 + e_1$ | $x_2 + e_2$ | $y_2 + e_3$ | $z_2 + e_4$ |
| . | . | . | . | . | . |
| . | . | . | . | . | . |
| . | . | . | . | . | . |
| −90 | −70 | $w_k + e_1$ | $x_k + e_2$ | $y_k + e_3$ | $z_k + e_4$ |
| . | . | . | . | . | . |
| . | . | . | . | . | . |
| . | . | . | . | . | . |
| 0 | 0 | $w_i + e_1$ | $x_i + e_2$ | $y_i + e_3$ | $z_i + e_4$ |
| . | . | . | . | . | . |
| . | . | . | . | . | . |
| . | . | . | . | . | . |
| 90 | 0 | $w_n + e_1$ | $x_n + e_2$ | $y_n + e_3$ | $z_n + e_4$ |

The present application make reference to certain processes that are described in the context of production, quality control, and/or testing of electronic devices and may be used to correct and/or identify codebooks. These processes may also be performed during regular usage of the electronic device. For example, an end user may perform a re-calibration of codebooks in the codebook database 104 using a reference antenna, which may be a fixed cellular antenna. Moreover, while the above description of the methods is made in the context of RF beamforming for transmission, the methods may be adapted to perform RF beamforming during reception. In some embodiments, the RF system may have different codebooks for transmitting RF signals and receiving signals. The mode of operation (e.g., transmitting mode or receiving mode) may be a parameter or an entry key.

In the above descriptions, certain methods employ mathematical calculations. The mathematical calculations may be performed numerically in the electronic devices and, as such, may be subject to quantization errors. As such, implementations of the above methods may employ tolerance margins to prevent quantization errors from generated unexpected results.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
   a memory component comprising a codebook database comprising a plurality of codebooks, each of the plurality of codebooks being searchable using an index based at least on a temperature measurement;
   front-end circuitry of a wireless network interface coupled to an antenna array, comprising:
   phase delay circuitry configured to apply a plurality of phase delays to a plurality of input signals to generate a beamformed RF signal using the antenna array;
   codebook circuitry comprising an active codebook and configured to program the phase delay circuitry; and
   processing circuitry configured to receive the temperature measurement from a sensor, retrieve a first codebook of the plurality of codebooks from the codebook database based on the temperature measurement, and replace the active codebook in the codebook circuitry with the first codebook.

2. The electronic device of claim 1, wherein the codebook circuitry comprises a first memory storage size smaller than 1 kilobyte and the memory component comprises a second memory storage size bigger than 1 kilobyte.

3. The electronic device of claim 1, wherein the codebook circuitry is configured to store a single codebook, and wherein the memory component is configured to store the plurality of codebooks.

4. The electronic device of claim 1, wherein the front-end circuitry comprises a codebook bus that couples the memory component and the codebook circuitry.

5. The electronic device of claim 4, wherein the front-end circuitry comprises baseband circuitry, and wherein the codebook bus comprises a tunnel through the baseband circuitry.

6. The electronic device of claim 1, wherein each of the plurality of codebooks are further searchable using an additional index based on a transmission power measurement, a carrier frequency measurement, or both.

7. The electronic device of claim 1, wherein the sensor comprises a thermistor.

8. The electronic device of claim 1, wherein the electronic device comprises a laptop, a mobile phone, a tablet computer, a watch, or any combination thereof.

9. A wireless network interface, comprising:
   radiofrequency (RF) head circuitry comprising:
   an antenna array;
   phase delay circuitry configured to apply a plurality of phase delays to a plurality of input signals to generate beamformed RF signals using the antenna array; and
   codebook circuitry comprising an active codebook that is searchable using an index based at least on a temperature measurement, the active codebook configured to program the phase delay circuitry; and
   transceiver circuitry comprising processing circuitry configured to perform instructions to:
   receive the temperature measurement from a sensor;
   request a first codebook that is searchable using the index from an application circuitry coupled to the wireless network interface, wherein the request for the first codebook comprises the temperature measurement; and
   load the first codebook to the codebook circuitry.

10. The wireless network interface of claim 9, comprising a codebook bus configured to transport the first codebook.

11. The wireless network interface of claim 10, comprising baseband circuitry, wherein the codebook bus comprises a tunnel through the baseband circuitry.

12. The wireless network interface of claim 10, wherein the codebook bus is a dedicated data bus.

13. The wireless network interface of claim 9, wherein the active codebook is further searchable using a second index based on a transmission power measurement, and wherein the transceiver circuitry comprising processing circuitry is configured to perform instructions to:
   receive the transmission power measurement;
   request a second codebook that is searchable using the second index from the application circuitry comprising the transmission power measurement; and load the second codebook to the codebook circuitry.

14. The wireless network interface of claim 9, wherein the active codebook is further searchable using a third index based on a carrier frequency measurement, and wherein the transceiver circuitry comprising processing circuitry is configured to perform instructions to:
   receive the carrier frequency measurement;
   request a second codebook that is searchable using the third index from the application circuitry comprising the carrier frequency measurement; and
   load the second codebook to the codebook circuitry.

15. The wireless network interface of claim 14, wherein the carrier frequency measurement is in one of a 450 MHz band, a 800 MHz band, a 850 MHz band, a 900 MHz band, a 1.8 GHz band, a 1.9 GHz band, a 2.4 GHz band, a 3.65 GHz band, a 4.9 GHz band, a 5 GHz band, a millimeter wave frequency band, or any combination thereof.

16. The wireless network interface of claim 9, wherein the wireless network interface is configured to join a cellular network, a WiFi network, or a Bluetooth® network.

17. The wireless network interface of claim 14, wherein the transmission power measurement comprises a nominal transmission power level.

18. A method to update an active codebook in a front-end of a wireless network interface of an electronic device, the method comprising:
    receiving, in processing circuitry of the wireless network interface, a temperature measurement, wherein the temperature measurement is associated with a codebook database that is searchable using an index based on the temperature measurement;
    requesting, by the processing circuitry, a first codebook from the codebook database, wherein the request comprises the temperature measurement; and
    loading the first codebook in codebook circuitry of the front-end of the wireless network interface.

19. The method of claim 18, wherein requesting the first codebook from the codebook database comprises:
    sending the request to a processor of application circuitry of the electronic device; and
    retrieving, from the codebook database in a memory of the application circuitry, the first codebook.

20. The method of claim 18, wherein loading the first codebook comprises sending the first codebook from the codebook database to the codebook circuitry using a dedicated codebook data bus.

* * * * *